US012071331B2

(12) United States Patent
Cadou et al.

(10) Patent No.: US 12,071,331 B2
(45) Date of Patent: Aug. 27, 2024

(54) CONTROL OF A HANDLING MACHINE

(71) Applicant: MANITOU BF, Ancenis (FR)

(72) Inventors: Sylvain Cadou, Ancenis (FR); Philippe Lebreton, Ancenis (FR)

(73) Assignee: MANITOU BF, Ancenis (FR)

( * ) Notice: Subject to any disclaimer, the term of this patent is extended or adjusted under 35 U.S.C. 154(b) by 245 days.

(21) Appl. No.: 17/606,878

(22) PCT Filed: May 7, 2020

(86) PCT No.: PCT/EP2020/062685

§ 371 (c)(1),
(2) Date: Oct. 27, 2021

(87) PCT Pub. No.: WO2020/229291

PCT Pub. Date: Nov. 19, 2020

(65) Prior Publication Data

US 2022/0204324 A1 Jun. 30, 2022

(30) Foreign Application Priority Data

May 10, 2019 (EP) .................................... 19305597

(51) Int. Cl.
*B66F 9/065* (2006.01)
*B66F 9/075* (2006.01)
*B66F 17/00* (2006.01)

(52) U.S. Cl.
CPC .......... *B66F 9/0655* (2013.01); *B66F 9/0755* (2013.01); *B66F 17/003* (2013.01)

(58) Field of Classification Search
CPC ..... B66F 9/0655; B66F 9/0755; B66F 17/003
See application file for complete search history.

(56) References Cited

U.S. PATENT DOCUMENTS

| | | |
|---|---|---|
| 2012/0039696 A1 | 2/2012 | Brooks et al. |
| 2013/0238202 A1 | 9/2013 | Aulton et al. |
| 2014/0058636 A1 | 2/2014 | Woods et al. |

FOREIGN PATENT DOCUMENTS

| | | |
|---|---|---|
| CN | 1681731 A | 10/2005 |
| CN | 103097279 | 5/2013 |
| EP | 2520536 | 11/2012 |
| WO | 2012065157 A1 | 5/2012 |

OTHER PUBLICATIONS

International Search Report dated Jul. 14, 2020.
Notification of the First Office Action dated Oct. 11, 2022.

*Primary Examiner* — Ramsey Refai
(74) *Attorney, Agent, or Firm* — IPSILON USA, LLP

(57) ABSTRACT

The invention relates to a handling machine (1) comprising: a tilt sensor (11) configured to produce a signal relating to a tilting moment applied to the main body about a tilting axis; displacement sensors (18) configured to produce a signal relating to movements of the handling arm relative to the main body; and a control unit (10) configured to: prevent or stop the movement of the handling arm if the signal representative of the tilting moment is greater than an effective threshold; assign a lowering threshold value to the effective threshold in response to a handling arm lowering movement being determined; and assign an extension threshold value to the effective threshold in response to a handling arm extension movement being determined.

9 Claims, 3 Drawing Sheets

[Fig. 1]
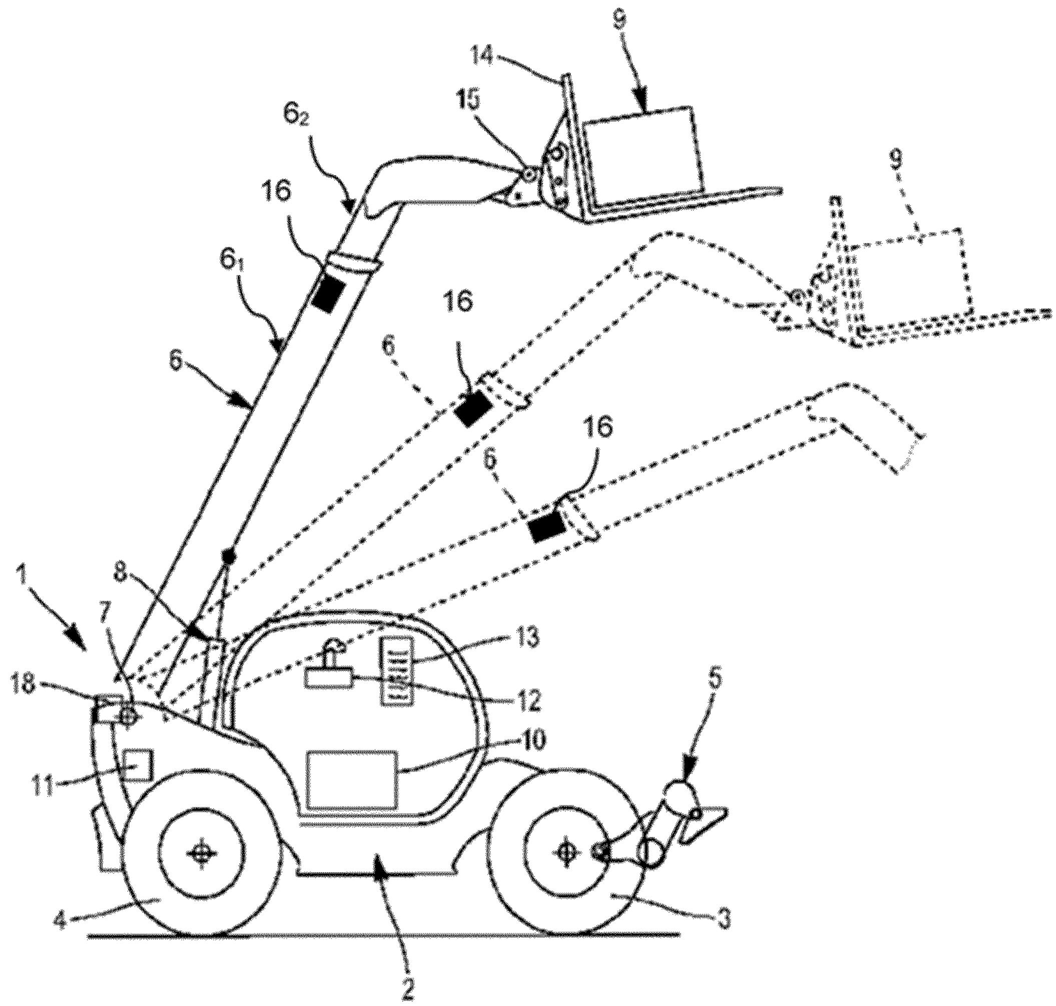

[Fig. 2]
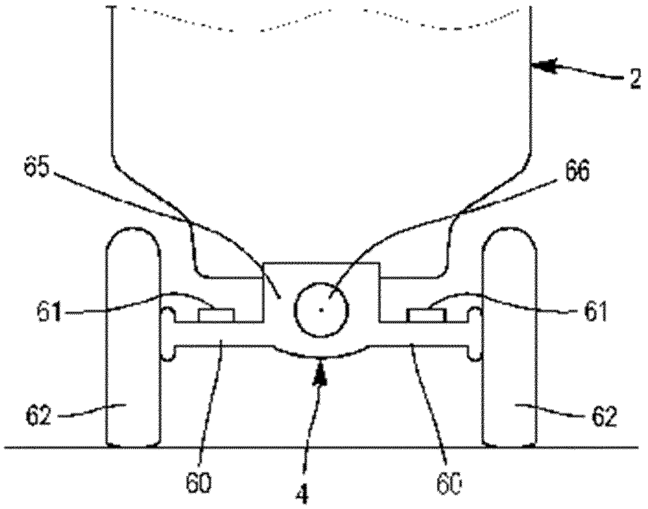
[Fig. 3]
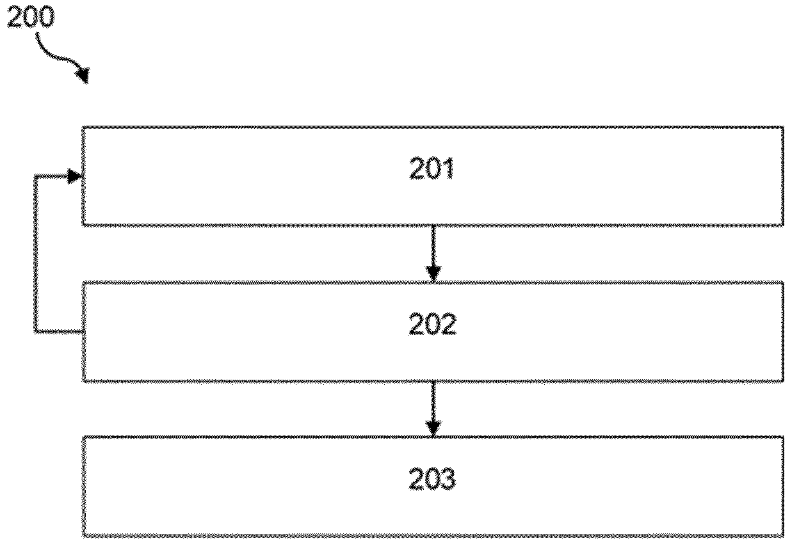

[Fig. 4]
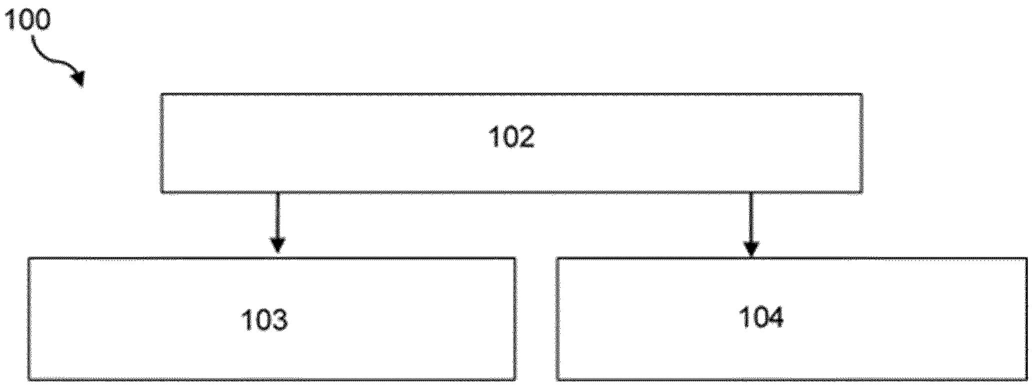

CONTROL OF A HANDLING MACHINE

RELATED APPLICATION

This application is a National Phase of PCT/EP2020/062685 filed on May 7, 2020, which claims the benefit of priority from European Patent Application No. 19 305 597.7, filed on May 10, 2019, the entirety of which are incorporated by reference.

TECHNICAL FIELD

The invention relates to the field of handling machines, in particular the control of a handling arm of such handling machines.

TECHNOLOGICAL BACKGROUND

A handling machine is known, as described by JP3252006, that comprises a machine body and a handling arm mounted to be movable with respect to the machine body. This machine undergoes, on the one hand, gravitational forces due to the load borne by the handling arm and to the weight of the machine and, on the other hand, inertial forces induced by the movements of the handling arm. These forces generate a tilting moment that is applied to the body of the machine which can provoke the imbalance, even tilting, of the machine when they exceed a certain threshold. This machine comprises a control means for limiting the movements of the handling arm in order to avoid such a tilting of the machine. In particular, the control means performs a deceleration then a stoppage of the handling arm when approaching a position of the handling arm at which the tilting moment is above a given threshold. This threshold varies as a function of a tilt angle of the handling arm with respect to the ground and a rate of approach to an authorized moment.

The threshold used in this machine does not distinguish between the case where the increase in the tilting moment results from a lowering of the handling arm and the case where it results from a deployment or an elongation of the handling arm. Now, the inertial forces implemented in both cases are very different.

SUMMARY

One idea on which this invention is based consists in providing a handling machine that allows a greater workspace for the handling arm without risking the tilting of the machine. For that, another idea on which this invention is based is to provide a handling machine in which the nature of the movement of the handling arm is taken into account in determining the threshold leading to the movement being cut.

The invention proposes a handling machine comprising:

a main body, a telescopic handling arm mounted on said main body and that can be displaced in rotation about a horizontal axis of rotation, and that can be deployed and retracted in a longitudinal direction of said handling arm, actuators configured to raise and lower and deploy and retract said handling arm;

a tilt detector configured to produce a signal relating to a tilting moment applied to the main body about a tilting axis of said handling machine;

displacement detectors or displacement request detectors configured to produce a signal relating to movements or requests for movement of the handling arm with respect to the main body; and a control unit configured to receive the signals from the tilt detector and from the displacement detectors or the displacement request detectors and to:

slow down, prevent or stop the movement of the handling arm if the signal representative of the tilting moment is above an effective threshold;

assign a lowering threshold value to said effective threshold in response to a determination of a handling arm lowering movement or lowering movement request;

assign an extension threshold value to said effective threshold in response to a determination, explicit or implicit, of an extension movement of the handling arm;

and wherein the lowering threshold value is lower than the extension threshold value.

In particular, the lowering threshold represents a smaller tilting moment than the tilting moment represented by the extension threshold.

Such a machine is advantageous in that it makes it possible to use a more restrictive threshold for the lowering movements of the handling arm than for the extension movements of the handling arm. In fact, the inertial forces generated by the interruption of a lowering movement of the handling arm are greater than those induced by the interruption of an extension of the handling arm. The matching of the threshold to the type of movement makes it possible, in an extension of the handling arm, to more closely approach the stability limit of the machine than in a lowering movement of the arm. The handling machine is thus more effective while remaining safe.

According to another aspect of the invention, a method is proposed for controlling a handling machine comprising a main body and a telescopic handling arm mounted on said main body and that can be displaced in rotation about a horizontal axis of rotation, and that can be deployed and retracted in a longitudinal direction of said arm, said method comprising:

determining a signal relating to a tilting moment applied to the main body with respect to a tilting axis of said machine, determining a signal relating to movements or requests for movement of the handling arm with respect to the main body, slowing down, preventing or stopping a movement of the handling arm if the signal representative of the tilting moment is above an effective threshold, assigning a lowering threshold value to said effective threshold in response to a determination of a handling arm lowering movement or lowering movement request, assigning an extension threshold value to said effective threshold in response to a determination, explicit or implicit, of an extension movement of the handling arm, and wherein the lowering threshold value is lower than the extension threshold value.

The control method can be executed by a control unit included in the handling machine.

According to advantageous embodiments, such a machine or such a method can have one or more of the following features.

The actuators of the handling machine can be produced in different ways. According to one embodiment, the actuators comprise a lifting actuator, for example of hydraulic or electric type, linked on the one hand to the handling arm and on the other hand to the main body, and is configured to displace the handling arm in rotation about the axis of rotation in order to perform upward and downward movements.

According to one embodiment, the handling arm comprises a plurality of deployable segments and the actuators comprise one or more extension actuators, for example of hydraulic type, each extension actuator being arranged between two or more segments configured to deploy or retract the handling arm.

The displacement detectors can be displaced in many ways. According to one embodiment, the displacement detectors comprise an angle sensor configured to measure a tilt angle of the handling arm with respect to a horizontal plane or with respect to the main body of the handling machine. The angle sensor can be arranged at the axis of rotation. The angle sensor can be an inclinometer.

Alternatively, the angle sensor can be a sensor arranged on a movable part coupled to the handling arm. Such a sensor can be configured to determine an actuation travel of the lifting actuator.

According to one embodiment, the displacement detectors comprise a length sensor configured to measure an amplitude of extension of the handling arm. The length sensor can be arranged on one or more segments of the handling arm and configured to measure a distance between the segment or segments with respect to the main body.

Alternatively, the length sensor can be a sensor arranged on a movable part coupled to the handling arm. Such a sensor can be configured to determine an actuation travel of the extension actuator or actuators.

The movement request detectors can be produced in different ways. According to one embodiment, the movement request detectors can be produced by one or more sensors with which a control lever or knob is equipped, this or these sensors being able, in a nonlimiting manner, to be switches, potentiometers or Hall-effect sensors, linked to a control unit equipped with a processor linked to a handling arm actuation member configured to manually drive the handling arm. In particular, said processor can be configured to determine a signal originating from said actuation member corresponding to a movement to be performed by said handling machine, for example a lowering, lifting, extension and retraction movement of the handling arm. According to one embodiment, the processor can be incorporated in the control unit.

According to one embodiment, the control unit is configured to assign the lowering threshold value to the effective threshold in response to a determination of both a lowering and an extension movement or movement request of the handling arm, simultaneously.

Such a configuration makes it possible to apply the lowering threshold, more restrictive than the extension threshold, during a movement composed of rotation and extension of the handling arm. The handling machine is thus safer.

According to one embodiment, the control unit is linked to the actuators and is configured to reduce a speed or an acceleration of said actuators, and/or stop a hydraulic or electrical supply of said actuators, when the signal representative of the tilting moment is above the effective threshold.

According to one embodiment, a signaling means is arranged in the handling machine and is configured to display or transmit a warning signal if the signal relating to the tilting moment is above the effective threshold. The warning signal can be audible and/or visual. The signaling means can be a display arranged in a cab of the handling machine provided for a user of the handling machine. Alternatively, or in addition, the signaling means can be an alarm arranged in said cab configured to transmit the warning signal.

In particular, the control unit is configured to control the signaling means to display or transmit the warning signal.

The control unit can be configured to determine a movement of the handling arm in different ways. According to one embodiment, the control unit is configured to detect a reduction of the tilt angle measured by the angle sensor and determine a lowering movement of said handling arm in response to a reduction of the tilt angle.

According to one embodiment, the control unit is configured to detect an increase in the length of the handling arm and determine an extension movement of said handling arm in response to the increase in the length of the handling arm.

The lowering threshold and the extension threshold can be chosen in different ways, notably so as to exclude movements involving an excessive quantity of movement, namely a quantity of movement that the machine is not able to absorb or dissipate without the risk of creating an instability. According to one embodiment, the lowering threshold and/or the extension threshold is/are predetermined, in particular as a function of the geometry of the handling arm and of the main body and previously stored in an onboard memory of the handling machine. In particular, the lowering threshold and/or the extension threshold are constant.

The tilt detector can be produced in different ways. According to one embodiment, the handling arm can be oriented about an axis transverse to the main body, in particular a horizontal axis situated at a first end of the handling arm, and the main body is mounted on wheels borne by axles, and,

- the tilt detector comprises a strain gauge arranged at an axle opposite a second end of the handling arm, and
- the signal relating to a tilting moment is a signal relating to a deformation of the axle opposite the second end of the handling arm.

According to one embodiment, the tilt detector comprises a pressure or force sensor arranged at the lifting actuator, the signal relating to a tilting moment being a signal relating to a load applied at the lifting actuator.

According to one embodiment, the tilt detector comprises several sensors measuring several physical quantities, in particular relating to a load borne by the handling arm and/or to a position of the handling arm. According to this embodiment, the tilt detector is configured to determine the signal relating to a tilting moment as a function of said physical quantities.

According to one embodiment, the handling machine comprises a plurality of stabilizer feet configured to be deployed or retracted from the main body, and the lowering threshold and/or the extension threshold varies as a function of the deployment or not of said stabilizer feet.

Such a handling machine can notably be produced in the form of a carriage with telescopic arms, a forklift truck, a lifting crane, a shovel dozer, a bucket loader or the like. The handling arm can also be able to be oriented about a vertical axis of the main body.

According to one embodiment, the method comprises an assignment of the lowering threshold value in response to a determination of both a lowering and an extension movement or movement request of the handling arm, simultaneously.

According to one embodiment, the method comprises a determination of the tilt angle of the handling arm with respect to a horizontal plane or the main body of the handling machine and a determination of a lowering movement when the tilt angle decreases.

According to one embodiment, the method comprises a determination of a length of the handling arm and a determination of an extension movement when the length of the handling arm increases.

According to one embodiment, the method comprises a signaling step comprising a display or a transmission of a warning signal if the signal relating to the tilting moment is above the effective threshold.

BRIEF DESCRIPTION OF THE FIGURES

The invention will be better understood, and other aims, details, features and advantages thereof will become more clearly apparent, from the following description of several particular embodiments of the invention, given in a purely illustrative and nonlimiting manner, with reference to the attached drawings.

FIG. 1 is a schematic representation of a handling machine.

FIG. 2 is a representation of a tilt detector that can be implemented by the handling machine of FIG. 1.

FIG. 3 is a schematic representation of a control method that can be implemented by the handling machine of FIG. 1.

FIG. 4 is a schematic representation of a method for determining an effective threshold that can be implemented by the handling machine of FIG. 1.

DESCRIPTION OF THE EMBODIMENTS

In FIG. 1, a handling machine 1, of forklift truck type, is represented. The handling machine 1 comprises a chassis 2 supported on the ground via a front axle 3 and a rear axle 4. The handling machine 1 comprises a handling arm 6 of telescopic type mounted on the chassis 2 and that can be oriented about an axis of rotation 7, horizontal with respect to the chassis 2. The handling arm 6 comprises a load carrier 14 articulated on the handling arm 6 by the link 15 and configured to carry a payload 9.

The handling arm 6 can be displaced in rotation by a cylinder 8 linked to the chassis 2 and to the handling arm 6. The handling arm 6 comprises at least two segments $\mathbf{6}_1$ and $\mathbf{6}_2$ that can be deployed using an extension cylinder, not represented, arranged between the at least two segments $\mathbf{6}_1$ and $\mathbf{6}_2$.

The handling machine 1 further comprises an actuation member 12 of the handling arm 6 configured to manually drive the handling arm 6 making it possible to raise and lower and deploy and retract the handling arm 6.

FIG. 1 shows the handling arm 6 bearing the payload 9 in a high and retracted position by a continuous line and in several lower and deployed positions by broken lines. The static tilting moment exerted by the handling arm 6 in the forward direction increases as it lowers toward the horizontal and/or as the length of the handling arm 6 increases.

The handling machine 1 also comprises displacement detectors 18 configured to produce a signal relating to a position of the handling arm 6, in particular a tilt angle of the handling arm 6 with respect to the chassis 2 and/or a length of extension of the handling arm 6.

The displacement detectors 18 comprise, for example, a first sensor situated at the axis 7 and arranged to measure the tilt angle of the handling arm 6. The displacement detectors are configured to produce a signal representative of the tilt angle of the handling arm 6 with respect to the chassis 2 as a function of the data from the first sensor. The displacement detectors 18 comprise, for example, a second sensor situated at the extension cylinder and arranged to measure a travel of said extension cylinder. The displacement detectors 18 are configured to produce a signal representative of the length of extension of the handling arm 6 as a function of the data from the second sensor.

The displacement detectors 18 allow the control unit 10 to determine a lowering movement and/or an extension movement of the handling arm 6. In particular, the control unit 10 determines a lowering movement of the handling arm 6 in response to a reduction of the tilt angle. Similarly, the control unit 10 determines an extension movement of the handling arm 6 in response to an increase in the length of extension of the handling arm 6, for example an increase in the travel of the extension cylinder.

The control unit 10 determines the nature of the movement of the handling arm 6. For that, several methods are possible. For example, the control unit 10 comprises a processing means configured to determine a signal representative of the speed of rotation of the handling arm 6 toward the axis 7. In this embodiment, the control unit 10 determines a lowering movement if the speed of rotation is non-zero toward the ground. In particular, the signal relating to the speed of rotation can be determined by measuring a hydraulic supply flow rate of the cylinder 8. Alternatively, the signal relating to the speed of rotation can be determined as a function of a variation in time of the tilt angle of the handling arm 6. Furthermore, the processing means is configured to determine a signal representative of the speed of extension of the handling arm 6. In this embodiment, for example, the control unit 10 determines an extension movement if the speed of extension is non-zero in a direction moving away from the chassis 2. In particular, the signal relating to the speed of extension can be determined by measuring a hydraulic supply flow rate of the extension cylinder. Alternatively, the signal relating to the speed of extension can be determined as a function of the variation in time of the length of the handling arm 6.

The handling machine 1 further comprises a tilt detector 11 configured to produce a signal relating to a tilting moment applied to the chassis 2 about a tilting axis, situated at the front axle 3. Stabilizer feet 5 can optionally be deployed to raise the front axle 3, in which case the stabilizer feet 5 define the tilt axis.

In one embodiment, the tilt detector 11 is arranged at the cylinder 8. In another embodiment, represented in FIG. 2, the tilt detector 11 is arranged at the rear axle 4.

In FIG. 2, the rear axle 4 of the handling machine 1 comprises two wheel support arms 60 bearing rear wheels 62. Each wheel support arm 60 comprises a strain gauge 61 configured to measure a tensile deformation of said wheel support arm 60 in a direction at right angles to said arm 60. Alternatively, the strain gauges 61 are configured to measure a bending deformation of the wheel support arm 60, in particular a variation of length between two bounds spaced apart on the wheel support arm 60. The measurement signals from the strain gauges 61 can be employed to form the signal indicative of the tilting moment, for example in the form of an average of the two measurement signals. Alternatively, it is possible to employ a single strain gauge 61 to produce the signal indicative of the tilting moment. Preferably, the rear axle 4 is swivelingly linked to the chassis 2 by means of a pivot 66 of longitudinal axis passing through a central part 65 of the axle.

The handling machine 1 further comprises a control unit 10 configured to receive the signals from the tilt detector 11 and from the displacement detectors 18 and slow down, prevent or stop the movement of the handling arm 6 if the signal representative of the tilting moment is above an effective threshold. For example, the control unit 10 is configured to prevent or stop the movement of the handling arm 6 by reducing or stop the movement of the handling arm 6 by reducing or stopping the hydraulic supply flow rate of the cylinder 8 and/or of the extension cylinder.

The control unit 10 is also configured to:

- assign a lowering threshold value to said effective threshold in response to a determination of a lowering movement of the handling arm 6;
- assign an extension threshold value to said effective threshold in response to a determination of an extension movement of the handling arm 6 combined with an absence of lowering movement.

The lowering threshold value is lower than the extension threshold value, such that the lowering threshold represents a smaller tilting moment than the tilting moment represented by the extension threshold. In other words, for an approach to the limit of stability of the handling machine by lowering of the handling arm 6, the movement is stopped further away from the stability limit, in tilting moment terms, than for an approach by extension of the handling arm 6 without lowering.

This setting takes account of the fact that the inertia forces implemented upon the interruption of a lowering movement of the arm are oriented more influentially on the stability of the machine than the inertia forces implemented upon the interruption of an extension movement of the arm.

The handling machine 1 comprises a display 13 linked to the control unit 10 and configured to display a warning signal if the signal relating to the tilting moment is above the effective threshold.

In one embodiment, the handling machine comprises a detector 16 of extension of the handling arm 6 configured to determine an extension of the handling arm 6.

In another embodiment, the extension of the handling arm is not expressly measured and the extension sensor is not necessary. In this case, the effective threshold can be determined on the basis of the tilt angle of the handling arm without taking into account an extension measurement. In fact, the increase in the tilting moment of the handling machine without lowering of the handling arm can be considered in certain cases as an implicit detection that an extension movement of the handling arm is in progress.

Alternatively, the setting of the effective threshold can be performed, not as a function of the movement of the arm, but as a function of the request for movement of the arm, that the control unit receives from the actuation member 12. In this case, the control unit 10 (or a movement request detector not represented in the figures) linked to the actuation member 12 is configured to determine a movement to be performed by the handling arm 6. In this case, the control unit 10 can be configured to:

- assign a lowering threshold value to said effective threshold in response to a determination of a request for lowering movement of the handling arm 6;
- assign an extension threshold value to said effective threshold in response to a determination of a request for extension movement of the handling arm 6 combined with an absence of lowering movement.

In all cases, the control unit 10 can be configured to implement a control method 200 for the handling machine 1, as represented in FIG. 3.

The control method 200 serves to slow down, prevent or stop the movement of the handling arm 6 in order to avoid a tilting of the handling machine 1.

The method 200 comprises:

- a step 201 of determination of a signal relating to a tilting moment that the chassis 2 undergoes, for example by determination of an elongation of the rear axle 3,
- a step 202 of comparison of the signal relating to the tilting moment to an effective threshold,
- a step 203 of slowing down, of stopping or of preventing the movement of the handling arm 6 when the signal relating to the tilting moment is above the effective threshold.

In one embodiment, the control unit 10 is configured to determine the effective threshold by implementing the method 100 represented in FIG. 4.

The method 100 comprises:

- a step 102 of determination of a signal relating to the tilt angle of the handling arm 6 with respect to the ground or with respect to the chassis of the machine or with respect to a horizontal reference, and of determination of a signal relating to the length of extension of the handling arm 6
- a step 103 of assignment of a lowering threshold value to the effective threshold in response to a determination of a reduction of the tilt angle of the handling arm 6,
- a step 104 of assignment of an extension threshold value to the effective threshold in response to a determination of an increase in the length of the handling arm 6.

Alternatively, the step 102 can consist in a step of determination of a movement request relating to a lowering or a raising of the handling arm 6. The movement request can be determined by determination of a particular actuation of the actuation member, for example orientation of the actuation member by a user in a predetermined direction. In this case, the step 103 of assignment of the lowering threshold to the effective threshold is performed in response to the determination of a request for lowering of the handling arm and the step 104 of assignment of the extension threshold to the effective threshold is performed in response to the determination of a request for extension of the handling arm 6.

The lowering and extension thresholds are chosen such that the tilting moment represented by the lowering threshold is smaller than the tilting moment represented by the extension threshold.

According to one embodiment, the lowering threshold and/or the extension threshold are previously determined and stored in a table or a database. In particular, the lowering threshold and/or the extension threshold can be constant or variable.

According to one embodiment, the lowering threshold and the extension threshold are preferably variable as a function of the deployment or not of the stabilizer feet 5.

Some elements represented, notably the control unit, can be produced in different forms, unitarily or distributed, by means of hardware and/or software components. Hardware components that can be used are custom integrated circuits ASIC, programmable logic arrays FPGA or microprocessors. Software components can be written in different programming languages, for example, C, C++, Java or VHDL. This list is not exhaustive.

Although the invention has been described in relation to several particular embodiments, it is quite obvious that it is in no way limited thereto and that it encompasses all the technical equivalents of the means described as well as their combinations provided the latter fall within the context of the invention.

The use of the verb "comprise" or "include" and its conjugate forms does not exclude the presence of elements or steps other than those stated in a claim.

In the claims, any reference symbol between parentheses should not be interpreted as a limitation on the claim.

The invention claimed is:

1. A handling machine comprising:

a main body, a telescopic handling arm mounted on said main body and that can be displaced in rotation about a horizontal axis of rotation, and that can be deployed and retracted in a longitudinal direction of said handling arm, actuators configured to raise and lower and deploy and retract said handling arm;

a tilt detector configured to produce a signal relating to a tilting moment applied to the main body about a tilting axis of said handling machine;

displacement detectors or displacement request detectors configured to produce a signal relating to movements or requests for movement of the handling arm with respect to the main body; and a control unit configured to receive the signals from the tilt detector and from the displacement detectors or displacement request detectors and to:

slow down, prevent or stop the movement of the handling arm if the signal representative of the tilting moment is above an effective threshold;

assign a lowering threshold value to said effective threshold in response to a determination]of a handling arm lowering movement or lowering movement request;

assign an extension threshold value to said effective threshold in response to a determination, explicit or implicit, of a handling arm movement or extension movement request;

and wherein the lowering threshold value is lower than the extension threshold value.

2. The machine as claimed in claim 1, wherein the control unit is configured to assign the lowering threshold value to the effective threshold in response to a determination of a lowering and an extension movement or movement request, simultaneously, of the handling arm.

3. The machine as claimed in claim 1, in which the lowering threshold and/or the extension threshold is predetermined.

4. The machine as claimed in claim 1, wherein the displacement detectors comprise an angle sensor configured to measure a tilt angle of the handling arm with respect to a horizontal plane or with respect to the main body of the handling machine.

5. The machine as claimed in claim 4, wherein the control unit is configured to detect a reduction of the tilt angle measured by the angle sensor and determine a lowering movement of said handling arm in response to the reduction of the tilt angle.

6. The machine as claimed in claim 1, wherein the displacement detectors comprise a length sensor configured to measure an amplitude of extension of the handling arm.

7. The machine as claimed in claim 6, wherein the control unit is configured to detect an increase in the length of the handling arm and determine an extension movement of said handling arm in response to the increase in the length of the handling arm.

8. The machine as claimed in claim 1, wherein the handling arm can be oriented about an axis transverse to the main body situated at a first end of the handling arm and the main body is mounted on wheels borne by axles, and wherein the tilt detector comprises a strain gauge arranged at an axle opposite a second end of the handling arm, and wherein the signal relating to a tilting moment is a signal relating to a deformation of the axle opposite the second end of the handling arm.

9. A method for controlling a handling machine comprising a main body and a telescopic handling arm mounted on said main body and that can be displaced in rotation about a horizontal axis of rotation, and that can be deployed and retracted in a longitudinal direction of said arm, said method comprising:

determining a signal relating to a tilting moment applied to the main body with respect to a tilting axis of said machine, determining a signal relating to movements or requests for movement of the handling arm with respect to the main body, slowing down, preventing or stopping a movement of the handling arm if the signal representative of the tilting moment is above an effective threshold, assigning a lowering threshold value to said effective threshold in response to a determination of a lowering movement or a request for lowering movement of the handling arm, assigning an extension threshold value to said effective threshold in response to a determination, explicit or implicit, of an extension movement of the handling arm, and wherein the lowering threshold value is lower than the extension threshold value.

* * * * *